C. L. BAENDER.
SNUBBER.
APPLICATION FILED JAN. 16, 1919.
1,337,878.
Patented r. 20, 1920.
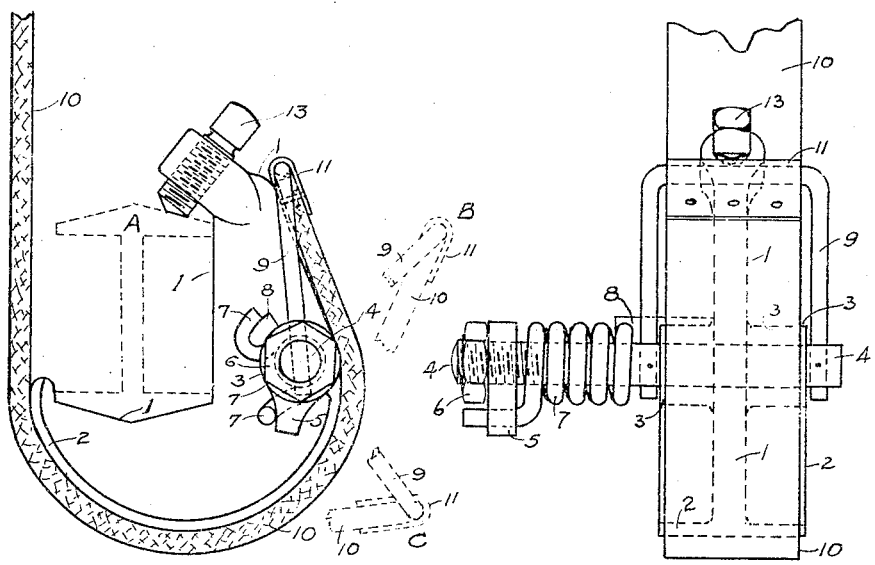
FIG 1
FIG 2
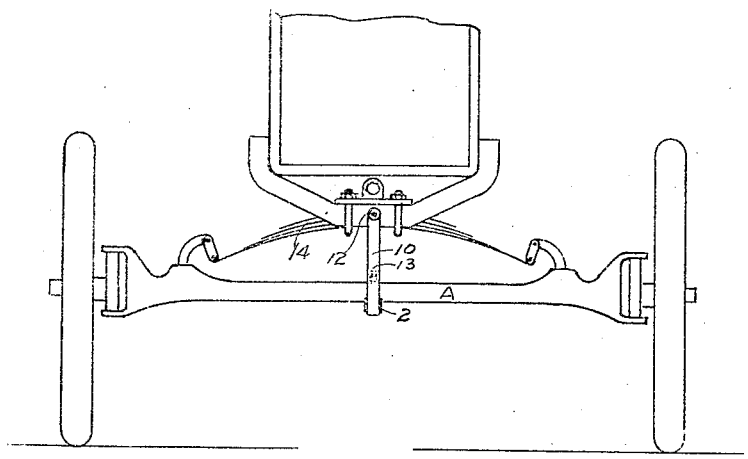
FIG 3
INVENTOR
Charles Lewis Baender
BY
ATTORNEY

UNITED STATES PATENT OFFICE.

CHARLES LEWIS BAENDER, OF OAKLAND, CALIFORNIA.

SNUBBER.

1,337,878.  Specification of Letters Patent.  Patented Apr. 20, 1920.

Application filed January 16, 1919. Serial No. 271,433.

*To all whom it may concern:*

Be it known that I, CHARLES LEWIS BAENDER, a citizen of the United States of America, residing at Oakland, in the county of Alameda and State of California, have invented certain new and useful Improvements in Snubbers, of which the following is a specification.

My invention relates to improvements in snubbers especially adapted to check the vibrations of springs of automobiles, or other vehicles, and consists in the peculiar construction, arrangement and combination of parts as more fully hereinafter described.

One object of my invention is to provide a snubber which will present the maximum resistance to the vibration of such springs at the time of their maximum compression or extension, and to offer such resistance to one direction of vibration only.

A further object of my invention is to provide a snubber of compact design, cheap to manufacture and easy to attach.

In the drawing, Figure 1 is a side view of the snubber; Fig. 2 is a rear view of the same and Fig. 3 is a front view as it appears attached to an automobile having a single front spring. My snubber may be applied to vehicles having other spring arrangements by suitable modifications in the design of the body of the snubber.

The same numbers refer to the same parts throughout the several views.

Referring to the drawings, the body of my snubber consists of a central web, 1, having a curved flange 2 partially surrounding its periphery, and terminating at one end in hub 3. There is a hole through this hub and a pin, 4, is rotatively located therein. One end of pin 4 is threaded, and upon this end are located stop-nut 5, lock-nut 6 and a helical spring, 7. The inner end of spring 7 is bent to engage and be held by lug 8, which is preferably a part of the body of the snubber. The outer end of spring 7 is also bent to engage a projecting part of stop-nut 5. Thus the tension in spring 7 may be adjusted by turning stop-nut 5 to the desired position and locking it there by means of lock-nut 6. Strap-arm 9 passes through pin 4 on both sides of hub 3, and is solidly fixed to pin 4 so as to rotate therewith. Friction member 10, here shown as a flexible strap, has one end rotatively connected to holder 9 by means of clip 11, and the other end is fastened by any suitable means to the vibrating element or body, as shown at 12, Fig. 3. By this construction member 10, the friction strap, is constrained to move upon the outer surface of flange 2, and it is the friction here developed by this movement that acts as a check or snub upon the motion of the vibrating member attached to upper end of 10.

The upper end of web 1 is constructed so as to pass or extend over axle A, and is fitted with set-screw 13, by means of which the snubber is attached to the axle of the vehicle.

The positions of the parts shown in Figs. 1 and 2 correspond to a condition of maximum compression of the vibrating spring shown at 14 in Fig. 3. Views B and C show other positions in dotted lines.

The center of pin 4 is located as near as practical to the outer edge of flange 2 so that, at the time of maximum compression of the spring 14, the line of pull of friction member 10 will be as near as possible to the center of pin 4. By this construction the turning-moment of the force acting through strap 10, as referred to the center of pin 4, will be a minimum, and, in consequence, the resistance offered to the upward movement of the vibrating member, such as the spring 14, or the body of the vehicle, will be a maximum. The upper limit of motion of the vibrating member will be reached when the horizontal arm of holder 9 is brought around to a position in contact with flange 2. But this position can only be attained by overcoming a constantly increasing pull due to the increased tension in spring 7, and the consequently increased friction between parts 2 and 10. This increasing resistance depends also upon the kind and degree of curvature of flange 2, which must be adapted to correspond with the motion of holder 9. There is, thus, a position corresponding to a nearly horizontal of holder 9 at which the pull required on strap 10 to cause rotation of pin 4 will be the least. This will be the proper position to which to adjust the snubber when the vibrating member is at rest.

Hence it will be seen that when the vibrating member is in its lowest position a maximum resistance is offered by the snubber, and this resistance decreases until the vibrating member reaches a point corresponding to a state of rest. The resistance of the snubber then increases, and is again a maximum when the vibrating member reaches the other limit of its motion. In fact, the snubber limits the upper movement of the vibrating member. Hence, calling the distance of the vibrating member on each side of its position of rest to its greatest distance therefrom the amplitude of the vibration, it will be seen that the resistance of the snubber to the vibration of the vibrating member in one direction, varies in direct ratio as the amplitude of the vibration. In other words, when the distance of the vibrating member on either side of its point of rest is the greatest, then will the resistance offered by the snubber to motion in one direction also be the greatest.

In the operation of automobiles, or other vehicles, it is desirable to avoid, as much as possible, any resistance to the upward motion of the tires when encountering obstructions or obstacles for the reason that such resistance will add to the force of the blow not only upon the tires, but upon the whole vehicle. It was, therefore, one of the objects of my invention to provide a snubber that would not interfere in any way with the upward movement of the tires, or, what is the same thing, with the downward movement of the vibrating member, with reference to the tires. It will be noted that the flexibility of strap 10 is such that no substantial resistance could be offered by it to the shortening of the distance between point 12 and axle A. Again, as this distance is decreased, due to compression of spring 14, strap 10 will be drawn back by spring 7 acting through holder 9.

Having thus described my invention, what I claim is:

1. A snubber for automobiles comprising a tension spring, a flexible member and a friction surface, and devices coöperating therewith whereby the effective action of said spring in preventing movement of the flexible member in one direction decreases from one extreme position of said flexible member to an intermediate position and increases from said intermediate position to the other extreme position thereof.

2. A snubber for automobiles comprising a spring, a flexible member, a friction surface over which said flexible member slides, a lever fulcrumed adjacent one end of said friction member and having its free end connected to the flexible member, said lever being connected to said spring and disposed so that the effective resisting action preventing movement of the flexible member in one direction decreases from one extreme position to an intermediate position and then increases from said intermediate position to the other extreme position of said flexible member.

3. A snubber for automobiles comprising means having a friction surface adapted to be attached to one member of the two relatively vibrating parts of an automobile, a lever fulcrumed to said means at a point substantially on the periphery of said surface, a flexible member engaging the friction surface and adapted to have its ends attached to the free end of said lever and to the other of said vibrating parts, and a spring so disposed that the effective resisting action to movement of the flexible member in one direction decreases from one extreme position to an intermediate position and then increases from said intermediate position to the other extreme position of said flexible member.

4. A snubbing attachment for automobiles comprising a clamp attached to the chassis and having a curved frictional surface, a shaft journaled in said clamp, a lever connected to said shaft, a flexible member having one end connected to the free end of said lever and arranged to slide over said friction surface, the other end of said flexible member adapted for connection to the vehicle spring, and a spring surrounding said shaft with one end thereof connected thereto and the other to said clamp and tending to normally hold the lever in a position substantially tangential to said friction surface.

In testimony whereof I have signed my name to this specification in the presence of two subscribing witnesses.

CHARLES LEWIS BAENDER.

Witnesses:
C. A. MILLER,
R. J. CHESNEY.